(No Model.)
A. FRIEDRICK.
FOUNTAIN FOR WATERING STOCK.
No. 428,838. Patented May 27, 1890.
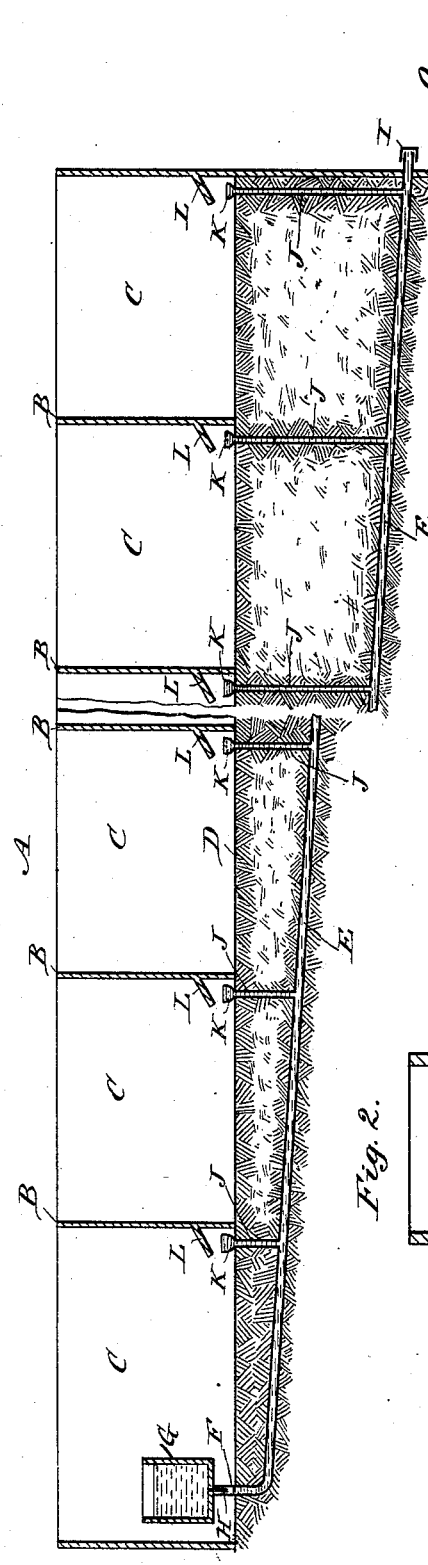
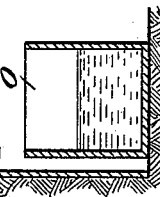
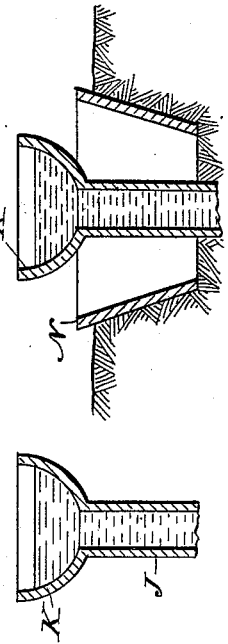
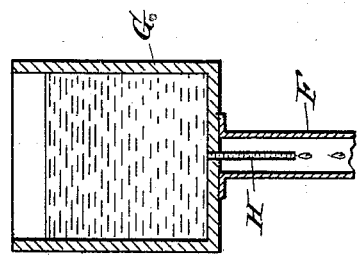
WITNESSES:
D. C. Reusch.
J. M. Henley
INVENTOR:
A. Friedrick
BY
Munn & Co
ATTORNEYS.

UNITED STATES PATENT OFFICE.

ALPHONSE FRIEDRICK, OF BALDWIN, NEW YORK.

FOUNTAIN FOR WATERING STOCK.

SPECIFICATION forming part of Letters Patent No. 428,838, dated May 27, 1890.

Application filed June 12, 1889. Serial No. 313,994. (No model.)

*To all whom it may concern:*

Be it known that I, ALPHONSE FRIEDRICK, of Baldwin, in the county of Queens and State of New York, have invented a new and Improved Fountain for Watering Stock, of which the following is a full, clear, and exact description.

The object of the invention is to provide a new and improved fountain which is specially adapted for watering poultry, and which is very simple and durable in construction, keeping the water cool and fresh in the summer and preventing it from freezing in the winter.
The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is an enlarged section of the reservoir and the main pipe. Fig. 3 is a like view of one of the cups, and Fig. 4 is a sectional elevation of a modified form of the cup.

The poultry-yard A is provided with a number of partitions B, which divide the yard into several compartments C, in which are placed different kinds of poultry in the usual manner.

In the ground D under the several compartments C is placed a main pipe E, held in an inclined position and provided at its highest end with an upwardly-extending pipe F, supporting the reservoir G, containing an amount of water sufficient to water all the poultry in the yard A.

In the bottom of the reservoir G is held a small drip-pipe H, which extends into the pipe F, the lower opening of the pipe H being very small or regulated with a faucet, so that the water from the reservoir G drips slowly into the pipe F. The opening in the pipe H is left of such size as to feed water to the main pipe E from the reservoir G in the quantity required. The lower end of the main pipe E is closed by a faucet or a cap I, and can be left dripping when regulated by supply-tank G to keep water pure and keep it from freezing in winter.

In the main pipe are secured a number of branch pipes J, which extend upward into the compartments C, there being one branch pipe for each compartment. On the upper end of each branch pipe J is held a cup K, located near the respective partition B of the compartment. The cup K preferably extends aboveground, so that the poultry can conveniently drink out of the cup, which is always supplied with water from the water dripping into the main pipe E. The tops of the cups K are of such level with the lower end of the pipe H that all the water passing into the pipe F and into the main pipe E fills the cups K continually. Above each cup K is held a slightly-inclined board L, secured to the respective partition B, and serving to prevent the poultry from stepping into the cup.

In order to prevent water from bubbling over one of the cups K and flowing into the respective compartment, I may surround the cup K and part of the branch pipe J with a box or short pipe N, as is plainly shown in Fig. 4. The diameter of the box N is somewhat greater than the diameter of the cup K, so that water bubbling over the cup K flows into the pipe N and passes to the ground below its surface, thus preventing the top surface of the ground from being saturated all through the compartments C.

When the operator desires to clean the main pipe E, the branch pipes J, and the cups K, he merely opens the cap I at the lower end of the main pipe E, so that all the water in the main pipe E, the branch pipes, and the cup K flows out of the lower end of the main pipe E, preferably into a reservoir O, set below the lower end of the main pipe E, as shown in Fig. 1. The water thus passing from the several parts out of the main pipe carries along all sediment and dirt which has collected in the several parts. When the pipe and its connections have been cleaned, the cap I is again secured to the end of the pipe E. The reservoir G is of such size as to keep the cups K filled continually during one day, or such time as provided for.

It will be seen that as the main pipe E and the branch pipes J are located underground the water passing through the said pipes is kept cool and fresh during the summer and is prevented from freezing in winter. It will further be seen that by this very simple means a constant supply of cool fresh water is furnished to the poultry in the several compartments. Considerable labor is saved, as only the reservoir G has to be filled once a day, it not being necessary for the operator to step into the several compartments to supply the poultry with water, as heretofore practiced.

It will be understood that any desired number of compartments can be connected with the pipe E in the manner shown and described.

Having thus fully described my invention, I claim as new and desire to secure by Letters Patent—

1. In a fountain for a poultry-yard, the combination, with a reservoir provided with a drip-pipe, of a main pipe laid underground in an inclined position and into which discharges said drip-pipe, branch pipes extending vertically from the said main pipe, and cups held aboveground on the outer ends of the said branch pipes, substantially as shown and described.

2. In a fountain for a poultry-yard, the combination, with a reservoir provided with a drip-pipe, of a main pipe laid underground in an inclined position and into which discharges said drip-pipe, branch pipes extending vertically from the said main pipe, and cups held aboveground on the outer ends of the said branch pipes, and a drip-pipe surrounding the said cups, substantially as shown and described.

ALPHONSE FRIEDRICK.

Witnesses:
   THEO. G. HOSTER,
   EDGAR TATE.